(12) United States Patent
Ouedraogo et al.

(10) Patent No.: US 8,768,088 B2
(45) Date of Patent: Jul. 1, 2014

(54) ERROR CONCEALMENT METHOD AND DEVICE

(75) Inventors: Nael Ouedraogo, Acigne (FR); Benoit Vandame, Betton (FR)

(73) Assignee: Canon Kabushiki Kaisha, Tokyo (JP)

( * ) Notice: Subject to any disclaimer, the term of this patent is extended or adjusted under 35 U.S.C. 154(b) by 741 days.

(21) Appl. No.: 12/506,539

(22) Filed: Jul. 21, 2009

(65) Prior Publication Data

US 2010/0021079 A1 Jan. 28, 2010

(30) Foreign Application Priority Data

Jul. 22, 2008 (FR) ...................................... 08 54998

(51) Int. Cl.
*G06K 9/00* (2006.01)

(52) U.S. Cl.
USPC .......................................................... 382/252

(58) Field of Classification Search
None
See application file for complete search history.

(56) References Cited

U.S. PATENT DOCUMENTS

| | | | |
|---|---|---|---|
| 6,636,565 B1 * | 10/2003 | Kim ........................ | 375/240.27 |
| 2001/0040700 A1 * | 11/2001 | Hannuksela et al. ...... | 358/261.2 |
| 2003/0026343 A1 * | 2/2003 | Kim et al. ................. | 375/240.27 |
| 2005/0044471 A1 * | 2/2005 | Chia et al. ..................... | 714/776 |
| 2007/0189398 A1 | 8/2007 | Hannuksela et al. | |
| 2008/0186404 A1 * | 8/2008 | Bull et al. ..................... | 348/616 |
| 2009/0003461 A1 * | 1/2009 | Kwon et al. ............. | 375/240.27 |

FOREIGN PATENT DOCUMENTS

| | | |
|---|---|---|
| EP | 0 382 509 | 8/1990 |
| EP | 1 689 196 | 8/2006 |
| JP | 2003-116136 | 4/2003 |
| KR | 10-2005-0076943 | 7/2005 |
| WO | 2006/072793 | 7/2006 |
| WO | 2006/122313 | 11/2006 |

OTHER PUBLICATIONS

Harmanci et al., "A Zero Error Propagation Extension to H264 for Low Delay Video Communications Over Lossy Channels", ICASSP 2005, pp. II-185 to II-188.
Sun et al., "Error Concealment Algorithms for Robust Decoding of MPEG Compressed Video", Signal Processing: Image Communication, 10, pp. 249-268 (1997).
Hadar et al., "New Hybrid Error Concealment for Digital Compressed Video" EURASIP Journal on Applied Signal Processing, 12, pp. 1821-1833 (2005).
French Document Rapport *De Recherche Préliminaire* dated May 26, 2009, regarding French Application 0854998.

* cited by examiner

*Primary Examiner* — Jingge Wu
(74) *Attorney, Agent, or Firm* — Fitzpatrick, Cella, Harper & Scinto

(57) ABSTRACT

The invention concerns a method of concealing errors in at least one part of a current image (i) a sequence of images (4), characterized in that it comprises the following steps:
  comparing (S81) said at least one part of the current image (i) with at least one corresponding part of a previous image (i−1), and
  selecting (S83) a temporal error concealment method or a spatial error concealment method to be applied in said at least one part of the current image, according to the result of said comparison step and at least one item of information relating to the errors concealed in said at least one corresponding part of the previous image.

14 Claims, 9 Drawing Sheets

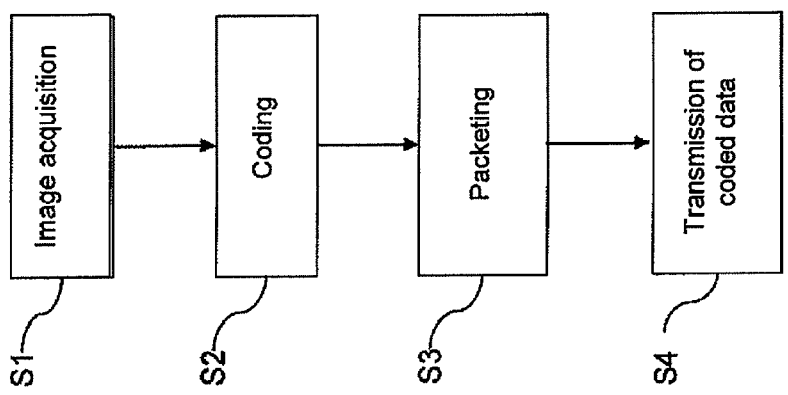
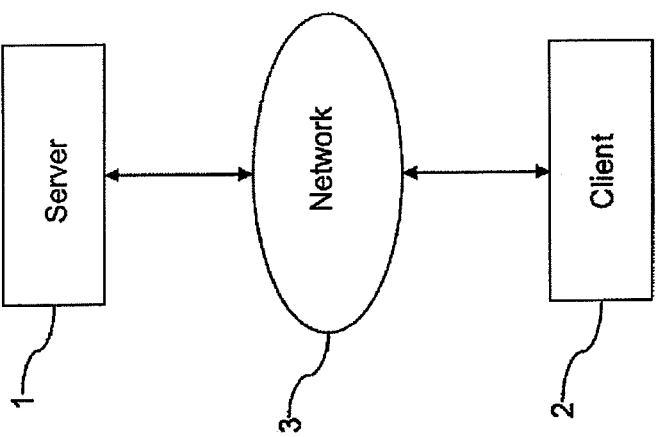
Figure 1

ERROR CONCEALMENT METHOD AND DEVICE

FIELD OF THE INVENTION

The present invention concerns an error concealment method.

More particularly, it concerns a method of concealing errors in an image in a sequence of images.

Correspondingly it concerns a device adapted to implement the method according to the invention.

BACKGROUND OF THE INVENTION

When a data stream, for example a sequence of images or video, is transmitted over a communication network, some data in the data stream are liable to be lost or corrupted.

The consequence of the data loss or corruption that occurs during the transmission of a video sequence is the appearance of artifacts (or artificial interference) in some images in the video sequence. These artifacts reduce the quality of the video sequence.

In order to improve the image quality, error concealment methods are applied to the images in the image sequence.

The error concealment methods can be divided into temporal methods and spatial methods.

Temporal methods consist of using the data in the previously decoded images in order to estimate the data corresponding to an image part comprising missing or erroneous data.

These methods present satisfactory results when the difference between a current image to be corrected and the previous images is small, that is to say when these images resemble each other.

Spatial methods, for their part, consist of using the correctly decoded data of a current image in order to estimate the data corresponding to a part of the current image comprising missing or erroneous data.

In general, these methods present less satisfactory results than the temporal methods, except when a change in scene takes place between the image to be corrected and the previously decoded image which will be used as a reference. This is because the image following a scene transition may be very different from the previous images. It is thus ineffective to use a previous image for estimating the erroneous image part.

The document US 2007/0189398 describes a method for concealing the errors in an image in a video sequence by means of an error concealment technique selected from temporal and spatial concealment techniques. The selection of the error concealment technique is made using a criterion of similarity between two images.

Nevertheless, the result obtained is not entirely satisfactory, the image comprising corrected data having in fact a difference with respect to the original image. Thus, when an image comprising corrected or concealed data is used as a reference (or as the previous image) in the application of a temporal concealment method, the errors in the image propagate and may increase in the following images.

It is therefore possible for two images that resemble each other to be considered to be different because of the error caused by the error concealment method and for the concealment method selected not to be the ideal method.

SUMMARY OF THE INVENTION

The aim of the present invention is to resolve at least one of the aforementioned drawbacks and in this regard to propose an error concealment method making it possible to select the error concealment method most suited to an image or to a given image part.

To this end, the present invention relates, according to a first aspect, to a method of concealing errors in at least one part of a current image in a sequence of images.

According to the invention, the error concealment method comprises the following steps:

comparing of said at one least part of the current image with at least one corresponding part of a previous image, and selecting of an error concealment method to be applied in said at least one part of the current image, according to the result of said comparison step and at least one item of information relating to the errors concealed in said at least one corresponding part of the previous image.

Thus the selection of the error concealment method to be applied for a current image takes account firstly of the comparison between the current image and a previous image and secondly the error concealment or concealments performed in the previous image.

This is because the error concealment applied in the previous image has an influence on the comparison between the current image and the previous image.

Thus it could be considered that two images which however resemble each other are different (according to the resemblance measurement criterion used) because of the error introduced by the concealment in the previous image.

This is the reason why account is taken of the previous error concealment when the most suitable method for the current image is selected.

It will be noted that the concealment method that is the most appropriate for concealing errors in the current image or in the current image part is thus determined dynamically.

As a result the concealment thus performed is more effective than previously and the concealed images therefore offer better quality.

It will be noted that the previous image is not necessarily the image immediately preceding the current image in the succession of images in the sequence.

According to one characteristic, the error concealment method comprises a step of determining a parameter representing a measurement of similarity between said at least one part of the current image and said at least one corresponding part of a previous image from the result of the comparison of said at least one part of the current image with at least one corresponding part of a previous image.

Thus a parameter representing a measurement of similarity or resemblance between the current image part and the corresponding previous image part is determined.

The parameter representing the similarity may either represent a direct similarity measurement, in which its value increases with the visual similarity between two images, or represent an inverse similarity measurement, in which case its value decreases with the visual similarity between two images, in order to reach zero for two identical images.

In practice, the comparison step comprises the comparison of the value of at least some of the pixels of said at least one part of the current image with the value of at least some of the pixels of said at least one corresponding part of the previous image respectively.

This is because the comparison is made on all the pixels of the image or only on part, according to the resources available and the degree of precision required.

Advantageously, the selection step comprises a substep of comparing said parameter representing a similarity measurement with a threshold determined from said at least one item of information relating to the errors concealed in said at least one corresponding part of the previous image.

It should be noted that, for one and the same current image, the parameter representing a similarity measurement has a different value when the previous image has not undergone any error concealment and when the previous image has undergone one.

Thus the parameter representing at least one similarity measurement depends on certain characteristics relating to the error concealment performed on the previous image.

It should be noted that the degree of similarity between the current image and the previous image depends on the type of concealment method used in the previous image.

This is because the use of a temporal concealment method for the error correction in the previous image in general introduces fewer errors than when a spatial concealment method is used.

In an embodiment in which the parameter representing a similarity measurement represents in an inverse similarity measurement, for the same current image and previous image pair, the measurement of similarity between the images is greater when a spatial concealment is employed.

It should be noted that, in determining the threshold, account is taken of the characteristics relating to the error concealment performed on the previous image. Consequently the error caused by the error concealment on the parameter representing the similarity is compensated for by taking account of the error concealment in the determination of the threshold.

According to one embodiment, the threshold represents a similarity value (limit value) as from which said at least one current image part and said at least one corresponding previous image part are no longer considered to be similar.

Thus the comparison of the parameter representing the similarity of the images with the threshold representing a similarity value as from which the images are no longer considered to be similar is not falsified by the errors caused by the error concealment implemented in the previous image.

According to one characteristic, when the number of concealed data is zero for a predetermined number of consecutive previous images, the threshold is reset to a predetermined value.

According to one characteristic, during the selection step, a temporal error concealment method or a spatial error concealment method is selected according to the result of the comparison of said parameter representing a similarity measurement with said threshold.

Thus, when the current and previous image parts do not resemble each other according to the criterion chosen for the comparison, the appropriate error concealment method is a spatial method.

On the contrary, when the current and previous image parts resemble each other according to the criterion chosen for the comparison, the suitable error concealment method is a temporal method.

According to one characteristic, said at least one item of information relating to the concealed errors comprises an item of information representing the number of concealed data in said at least one corresponding part of the previous image.

This is because the number of concealed data items in the part of the previous image, that is to say the surface area of the part of the previous image comprising masked data, has an impact on the quantification of the resemblance (parameter representing a similarity measurement) between the part of the current image and the corresponding part of the previous image. This number is therefore taken into account in the determination of the threshold.

According to another characteristic, the selection of the error concealment method to be applied in said at least one part of the current image is also made according to the type of coding of said at least one part of the current image.

This is because, when the coding employed for the part of the current image does not have recourse to another reference image (for example coding of the INTRA or I type in the terminology of the H.264 or MPEG4 standards), the error introduced by the error concealment in the part of the previous image is not transmitted to the part of the current image during its decoding.

On the contrary, when the coding employed for the current image requires another reference image (for example coding of the INTER or P or B type in the terminology of the H.264 or MPEG4 standards), the error introduced by the error concealment in the previous image is transmitted to the current image during its decoding.

Thus, employing this type of coding or not employing it has an impact on the determination of the resemblance between the current and previous image parts. The type of coding is therefore taken into account in the determination of the threshold.

According to another characteristic, said at least one item of information relating to the concealed errors comprises information representing the concealment method applied to said at least one corresponding part of the previous image.

Consequently the efficacy of the concealment method employed is taken into account during the determination of the threshold and therefore during the selection of the concealment method for the current image.

In one embodiment, the previous image corresponds to the image decoded before the current image.

Thus implementation of the method is simple, in particular with regard to the storage of data.

In another embodiment, the previous image corresponds to the image preceding the current image in the order of display of the images in the sequence.

This is because this previous image has a high probability of resembling the current image.

In another embodiment, the comparison step comprises the comparison of a histogram of the current image with a histogram of the previous image.

According to a second aspect, the present invention concerns a device for concealing errors in at least one part of a current image in a sequence of images.

According to the invention, the device comprises:
  means of comparing said at least one part of the current image with at least one corresponding part of a previous image, and
  means of selecting an error concealment method to be applied in said at least one part of the current image, according to the result obtained by the comparison means and at least one item of information relating to the errors concealed in said at least one corresponding part of the previous image.

According to one characteristic, the device comprises means of determining a parameter representing a measurement of similarity between said at least one part of the current image and said at least one corresponding part of a previous image.

According to one characteristic, the comparison means are adapted to compare the value of at least some of the pixels of said at least one part of the current image with a value of at least some of the pixels of said at least one corresponding part of the previous image respectively.

According to one characteristic, the selection means comprise means of comparing said parameter representing a measurement of similarity with a threshold determined from said at least one item of information relating to the errors concealed in said at least one corresponding of the previous image.

According to one characteristic, the selection means are adapted to select a temporal error concealment method or a spatial error concealment method according to the result of the comparison of said parameter representing a similarity measurement with said threshold.

According to another characteristic, the comparison means are adapted to compare a histogram of the current image with a histogram of the previous image.

The present invention concerns, according to a third aspect, a means of storing information that can be read by a computer or a microprocessor containing instructions of a computer program, adapted to implement the method as succinctly described above, when the information stored is read by the computer or microprocessor.

In a particular embodiment, this storage means is partially or totally removable.

The present invention concerns, according to a fourth aspect, a computer program product that can be loaded into a programmable apparatus, containing sequences of instructions for implementing the method as succinctly described above when this computer program is loaded into and executed by the programmable apparatus.

The advantages of the error concealment device and the particular characteristics and advantages of the information storage means and of the computer program product being similar to those of the error concealment method, they are not repeated here.

BRIEF DESCRIPTION OF DRAWINGS

Other particularities and advantages of the invention will also emerge from the following description made with reference to the accompanying drawings, given by way of non-limitative examples and in which:

FIG. 1 depicts schematically the context of the present invention;

DETAILED DESCRIPTION OF PARTICULAR EMBODIMENTS

Figure 2:
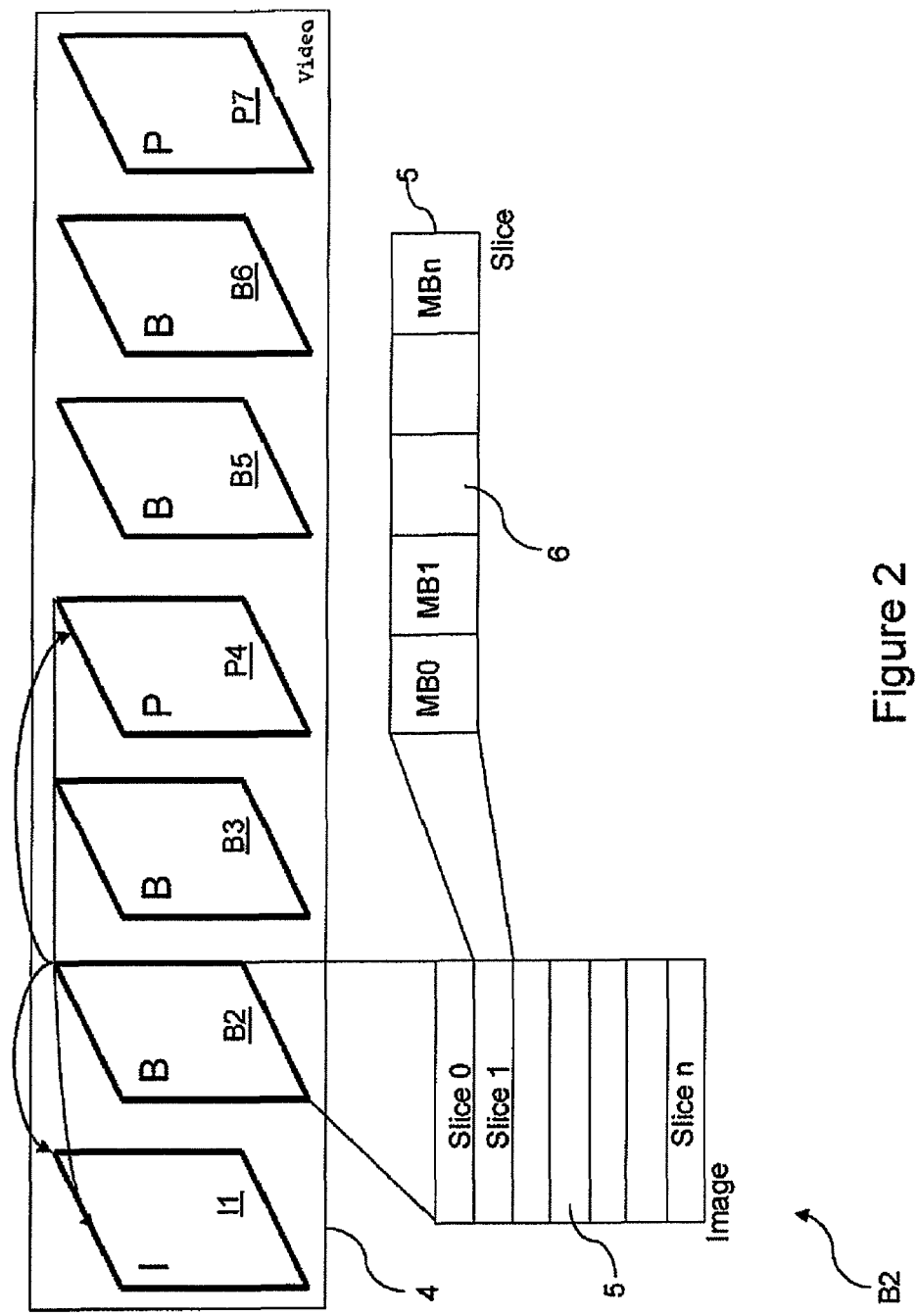
FIG. 2 depicts schematically the coding of an image sequence.

The context in which the invention is situated will be described first of all with reference to FIG. 1.

FIG. 1 depicts a server device 1, a client device 2 and a network 3. The server 1 represents a data sending system, the client 2 a reception system and the network 3 a system for transmission between the server 1 and the client 2.

The data transmitted from the server 1 to the client 2 through the network 3 are for example video data.

In this context, one functionality of the server 1 consists of implementing an acquisition step S1 in order to capture data, for example data corresponding to an image or to an image sequence or a video sequence. Next, each image acquired is coded during a coding step S2, put in packets at step S3 and transmitted to the client during a transmission step S4.

For example, the standard used for coding is an MPEG standard, for example MPEG-1, MPEG-2 or MPEG-4.

In the embodiment described above, a coding is used based on the prediction of the movement between the various images in a sequence of images.

For example, in a videoconferencing system, a video sequence is captured during the acquisition step 1 by a camera. Next each of the images making up the video sequence is real-time coded during the coding step S2 in order to form a stream of coded data. This stream of coded data will be transmitted to one or more clients, during the transmission step S4.

The operations are performed as quickly as possible in order to comply with the real-time display constraint.

Prior to the implementation of the data transmission during the transmission step S4, the data are encapsulated in network packets in accordance with a given protocol, for example the RTP protocol "Real Time Protocol". This data encapsulation step is designated by the term data "packeting".

The steps of coding S2, packeting S3 and transmission S4 will be described in more detail with the help of FIG. 2.

It should be noted that, during the transmission of the data over the network 3, network packets may be lost or altered. For example, in a case of congestion of the network, nodes in the network are caused to delete or reject some network packets.

The steps of coding S2, packeting S3 and transmission S4 will now be described with the help of FIG. 2.

FIG. 2 depicts a video sequence 4 comprising a series of images I1, B2, B3, P4, B5, B6, P7.

The video sequence 4 is coded by means of a coder based on movement prediction, in accordance for example with the standard H.264 or MPEG4 Part 2.

In these standards, the coding may be of the INTRA or INTER type.

INTRA or I coding is performed without using a reference image, that is to say an image coded according to an INTRA coding does not depend on other images.

P-type INTER coding for its part is performed according to a reference image by compensating for the movement between the reference image (previously coded) and the image to be coded. The movement between the two images is evaluated, this evaluation serving to deduce a set of movement vectors representing the translational movement between the images. From this set of movement vectors, an image is predicted. The difference between this predicted image and the image to be coded is calculated and coded with the set of movement vectors. It will thus be noted that this type of coding significantly reduces the quantity of data to be coded.

B-type INTER coding is similar to P-type INTER coding but is performed according to two reference images.

In FIG. 2, the image I1 is an INTRA image, the images B2, B3, B5 and B6 are B-type INTER images and the images P4 and P7 are P-images INTER images. For example, the image B2 is coded by taking as a reference the images I1 and P4. For the coding of the image P4, the image I1 is taken as the reference image.

Each image in the video sequence 4 is divided into slices 5 and each slice 5 is divided into elementary coding units called macroblocks 6. According to certain standards, each macroblock 6 can be divided into several sub-macroblocks.

It should be noted that a type B INTER image may comprise macroblocks of types I, P or B; a P-type INTER image may comprise macroblocks of types I and P and an INTRA image may comprise solely type I macroblocks.

When INTER images (of type P or B) are used, the coding cost is lower than that corresponding to the coding of an I image. Nevertheless, I images make it possible to avoid the propagation of errors from the previous images. Thus the regular use of INTRA coding makes it possible to eliminate errors that appeared previously, and therefore to achieve a refreshing of the video sequence 4.

Some servers use this technique called Intra Refresh. Other servers determine the image areas that are difficult to correct by an error concealment method and force the use of INTRA macroblocks for these areas. This technique is called Adaptive Intra Refresh or AIR.

As cited above, once the video data are coded, they are put in packets. There exist moreover several packeting techniques. Thus a network packet may comprise several slices, only one slice or a slice fragment.

Consequently the loss of a network packet during its transmission results in the loss of at least part of a slice.

Figure 3:
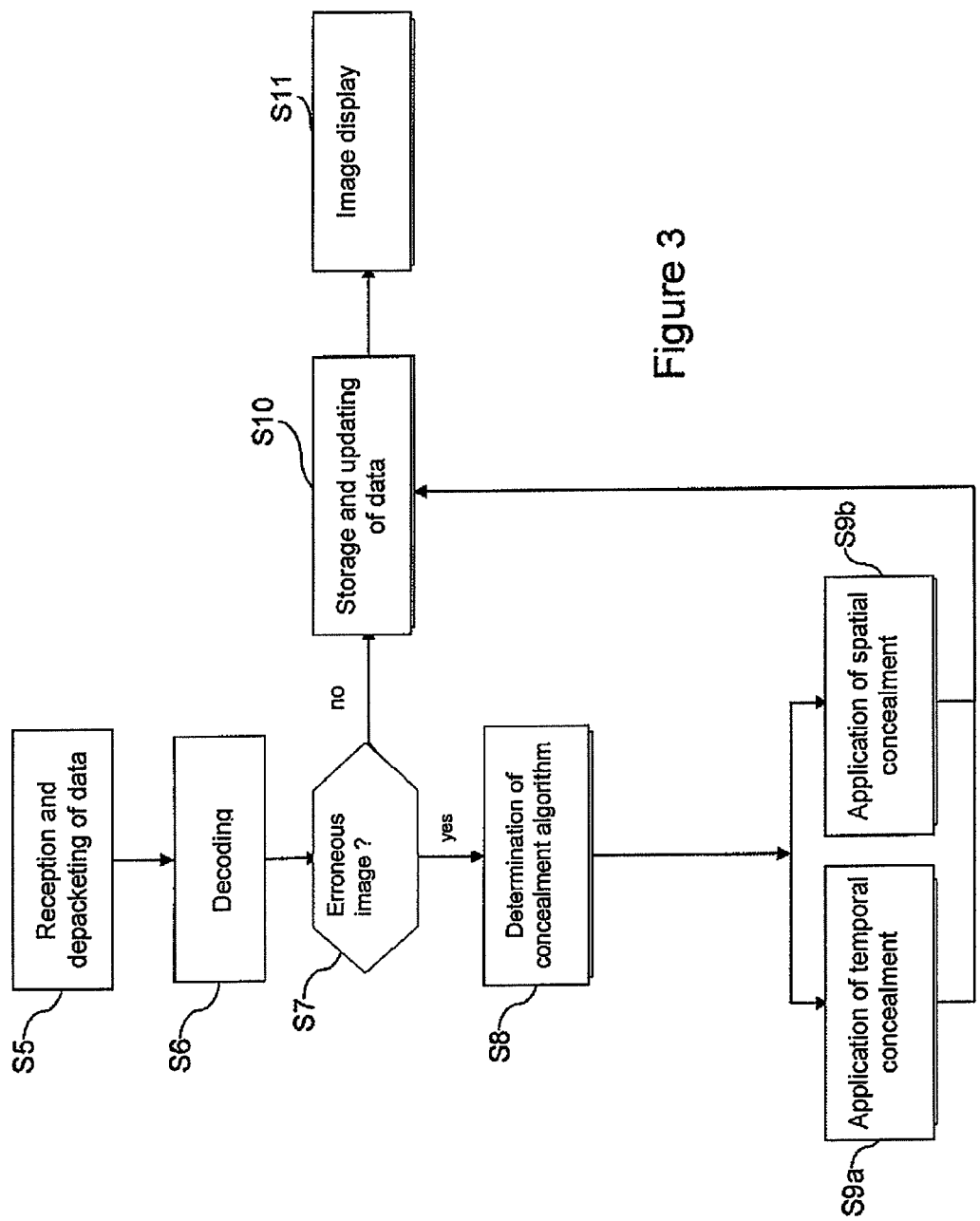
FIG. 3 is a flow diagram depicting an embodiment of a method according to the invention implemented by a client.

The functioning of a client device according to the invention will now be described with reference to FIG. 3.

The network packets transmitted over the network are received and depacketed during a reception and depacketing step S5. This step consists of extracting the data from the network packets and reconstituting the slices making up each image.

Next, during a decoding step S6, the data are decoded by means of a decoder. Once the data are decoded, the decoder, during a verification step S7, determines whether the decoded image comprises missing or erroneous data.

When the images comprise missing or erroneous data, step S7 is followed by a step S8 of determining the concealment method to be applied to the image. This determination step S8 will be described in detail with the help of FIG. 5. Thus, once the concealment method is determined, either a step of applying a temporal error concealment S9a or a step of applying a spatial error concealment S9b is implemented.

Once the error masking application step S9a, S9b is performed, a step of storing and updating data S10 is proceeded with.

Parameters and information stored and updated in this storage and updating step S10 will be described below.

When it is verified at the verification step S7 that the image is correctly decoded, that is to say does not contain any missing or erroneous data, parameters concerning the decoded image (for example the pixels of the image) are stored during a storage step S10. The decoded image (with or without error concealments) is then sent to a display in order to implement a step S11 of displaying the decoded image.

In another embodiment, the decoding image is stored during the storage step S10 in order to be used subsequently.

It should be noted that, during the implementation of one of the error concealment application steps S9a, S9b, an error concealment method is selected from several methods. Thus a spatial method is selected from several spatial methods and a temporal method is selected from several temporal methods.

Temporal and spatial error concealment methods will now be described with the help of FIG. 4.

Figure 4:
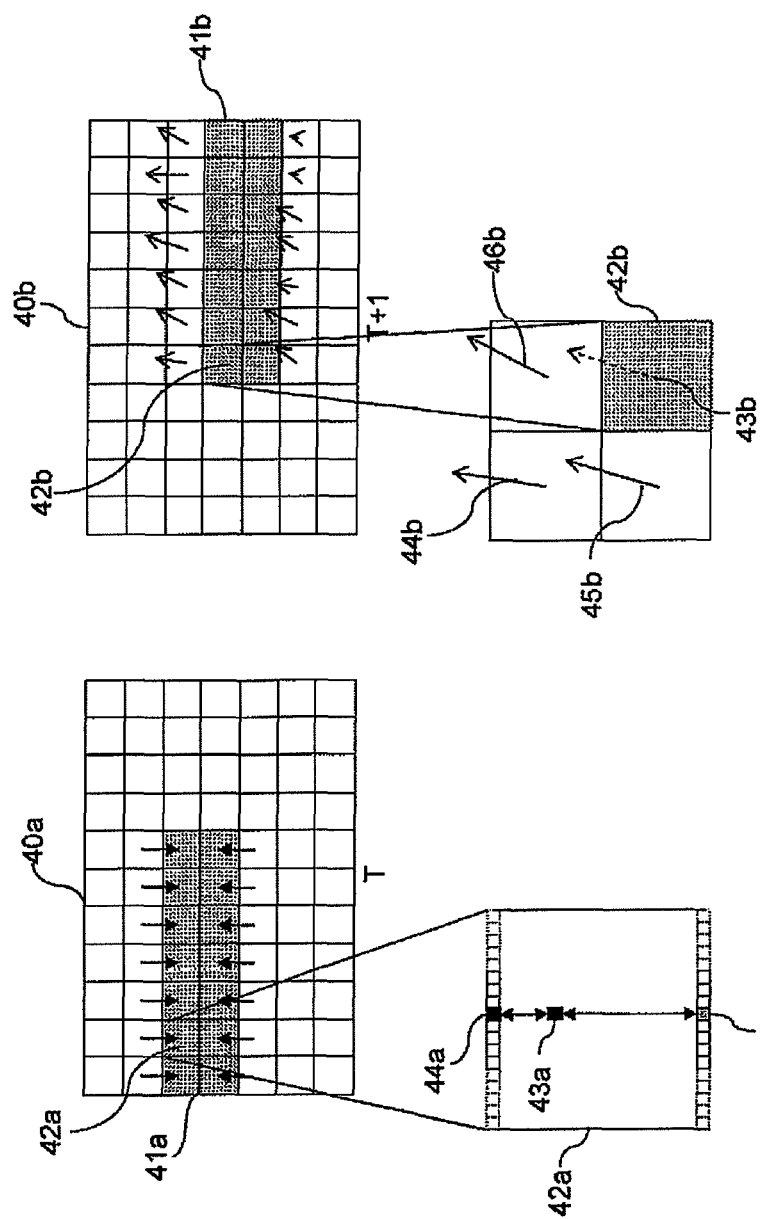
FIG. 4 depicts two zones of images comprising respectively two blocks of missing or erroneous data.

FIG. 4 illustrates images 40a, 40b that follow each other in a sequence of images. A first image 40a comprises an erroneous zone 41a corresponding to missing or erroneous data. Likewise, a second image 40b contains a second erroneous zone 41b corresponding to missing or erroneous data.

At the selection step of the error concealment method S8, a spatial concealment method has been selected for the first image 40a and a temporal masking method for the second image 40b.

The spatial concealment method applied to the first image 40a consist of using the valid pixels (without error), situated at the boundary of the erroneous zone 41a, in order to conceal the pixels of the erroneous zone 41a.

A macroblock 42a of the erroneous zone 41a is enlarged and depicted schematically in order to describe one method of implementing a spatial method.

As illustrated in FIG. 4, in this example, a missing or erroneous pixel 43a in the macroblock 42a is determined/concealed by determination of the barycentre of a first valid pixel 44a situated at the top boundary of the erroneous zone 41a and second valid pixel 45a situated at the bottom boundary of the erroneous zone 41a. The two valid pixels 44a, 45a are situated on the same column. When one of the valid pixels 44a, 45a is not available (for example when the erroneous zone 41a is situated at the image border), the value of the missing or erroneous pixel 43a corresponds to the value of the valid pixel 44a or 45a that is available. If none of the valid pixels 44a, 45a is available (for example when all the macroblocks of the image have been lost during transmission), the value of the missing or erroneous pixel 43a corresponds to a predefined value. In the latter case, an alternative consists of not applying a spatial method to the image.

The temporal concealment method applied to the second image 40b consists of estimating the movement vectors of the macroblocks of its erroneous zone 41b. The movement vector of each macroblock of the erroneous zone is determined by taking a mean of the movement vectors corresponding to the macroblocks adjoining the erroneous zone 41b.

Thus, for example, the movement vector 43b corresponding to the macroblock 42b of the erroneous zone 41b is determined from the movement vectors of the adjoining macroblocks, that it to say the value of the movement vector 43b is defined as the mean of the values of the movement vectors 44b, 45b and 46b.

If the adjoining macroblocks are of the INTRA type (no movement vector is available), the value of the movement vector 43b of the macroblock 42b corresponds to a predefined value, for example the zero value.

Once all the movement vectors of the macroblocks of the erroneous zone 41b are determined, the pixels of the missing or erroneous macroblocks are replaced by the value resulting from the movement compensation of the macroblocks of the erroneous zone 41b with respect to the previous image 41a.

The determination of the movement vectors of a current image (here the second image 40b) with respect to a previous image (here the first image 40a) is known to persons skilled in the art and will not be detailed here.

One method of implementing the determination step S8 of the concealment method will now be described with the help of FIG. 5.

Figure 5:
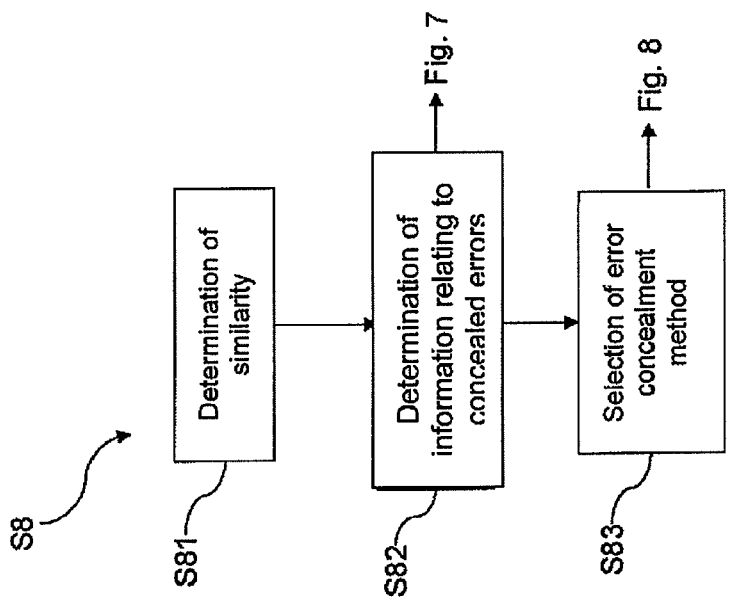
FIG. 5 is a flow diagram representing an embodiment of step S8 of FIG. 3.

The flow diagram depicted in FIG. 5 is implemented for each image in a sequence of images comprising missing or erroneous data.

The method according to the invention, and in particular the algorithm in FIG. 5 described below, is implemented for current and previous images corresponding to entire images.

Nevertheless it could be implemented for a current image part and for a corresponding previous image part.

Thus, for each current image comprising missing or erroneous data, a step S81 of comparing this current image and a previous image is implemented in order to determine the resemblance or similarity between these images.

This comparison step S81 will be described in more detail with the help of FIG. 6.

The previous image corresponds to an image previously decoded with respect to the current image. This previous image can be chosen according to several embodiments.

In a first embodiment, the previous image corresponds to the image decoded before the current image.

If we return to FIG. 2, it can be seen that the order of decoding of the first four images in the sequence of images is as follows: I1, P4, B2 and B3. Nevertheless, the display order is I1, B2, B3 and P4.

Thus, in this embodiment, if, for example, the image B2 is the current image, the previous image corresponds to the image P4.

The advantage of this embodiment is the simplicity of implementation with regard to the storage of data, since only the last decoded image has to be stored.

In a second embodiment, the previous image corresponds to the image preceding the current image in the order of display of the images in the sequence of images.

Thus, in the example in FIG. 2, the image preceding the current image B2 corresponds to the image I1.

The advantage of this embodiment is the use of a previous image that has high probabilities of resembling the current image.

Once the degree/level of resemblance between the two images is determined, a step S82 of determining information relating to the errors concealed in the previous image is implemented.

In this determination step S82, the concealment of errors carried out at the previous image is taken into account. This step will be described in detail with the help of FIG. 7.

Results obtained during the comparison S81 and determination S82 steps are used during a selection step S83 in order to select the type of error concealment to be applied to the current image. The selection is made according to the result of said comparison step and at least one item of information relating to the errors concealed in said at least one corresponding part of the previous image. This selection step S83 will be described in detail with the help of FIG. 8.

It should be noted that various embodiments can be employed for implementing the step S81 of comparing the current image and the previous image. These embodiments will now be described with the help of FIG. 6.

According to one embodiment, the comparison step S81 consists of comparing the histograms of the current image i (shown on the left hand part of FIG. 6) and a previous image i−1 (not shown in the figure). Thus, during this step, the histograms of the current image i and of the previous image i−1 are calculated, the histograms calculated are stored and the difference between them is determined.

In this embodiment, in calculating the histogram account is taken of all the pixels of the image, and the dynamic range of the histogram is reduced, that is to say by reducing the number of possible values of the histogram. More particularly, the histogram is measured on the pixels 51 having coordinates that are multiples of four, the amplitude of the pixels 51 being divided by 16.

Thus the speed of calculation of the histogram and its coding cost are reduced.

In another embodiment, in calculating the histogram, account can be taken of all the pixels composing the image and/or without reducing the dynamic range of the histogram, that is to say without reducing the number of possible values of the histogram. In this case, the speed and storage cost are higher, but the histogram is more precise.

According to yet another embodiment, in calculating the histogram account is taken of at least all the pixels of the image without reducing the dynamic range of the histogram.

Figure 6:
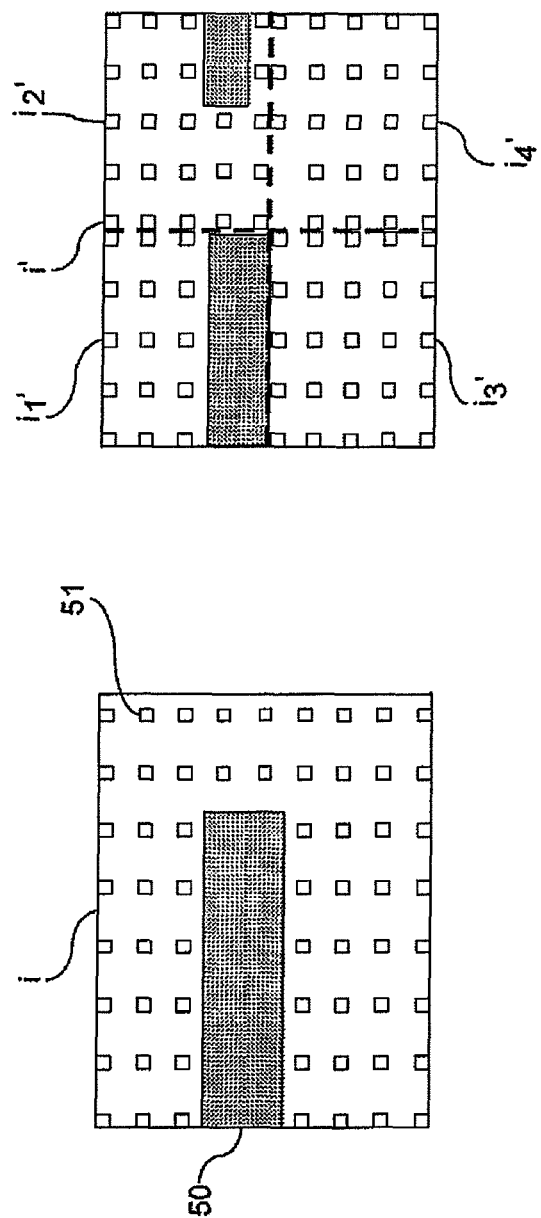
FIG. 6 depicts two zones of images comprising respectively two blocks of missing or erroneous data.

The current image i in FIG. 6 comprises a non-decoded zone 50 corresponding to data lost during the transmission of the data over the network 3.

According to a first method of calculating the histogram, the pixels of this non-decoded zone 50 not being valid, they are not taken into account for calculating the histogram of this current image i.

Thus the calculation of the histogram of the previous image i−1 that is to be compared with the current image i is carried out on the same image zone so that the histograms of the two images are calculated on the basis of the same quantity of information.

A second method of implementing the calculation of the histogram consists of evaluating the movement between the current image i and the previous image i−1, so as to estimate the position of the non-decoded zone 50 of the current image i in the previous image i−1.

The advantage of this method is that it actually takes account of the movement between the current image i and previous i−1 images so that the respective histograms are calculated on truly comparable data.

The first method has better performance in terms of speed and complexity of calculation since the estimation of the movement between the current i and previous i−1 images is not necessary.

Once the histograms of the current image and of the previous image have been calculated, the integral of the absolute differences between the two histograms is calculated according to the following equation:

$$S_i = \frac{\sum_{k=0}^{N-1} |H_i(k) - H_{i-1}(k)|}{NbPix}$$

in which Hi(k) represents the histogram of the current image i for a brightness level k. More particularly, it is a case of the number of pixels in the current image i having a brightness value k among all the pixels on which the calculation of the histogram is carried out or NbPix.

Likewise, Hi−1(k) represents the number of pixels in the previous image i−1 having a brightness value k among all the pixels on which the calculation of the histogram NbPix is carried out.

N corresponds to the number of brightness values considered for calculating the histogram. Thus, for example, if there are brightness values k ranging from 1 to 255, N equals 256 if all the brightness values are employed during the calculation of the histogram.

In this case, the dynamic range of the histogram is not reduced.

If on the other hand the dynamic range of the histogram is reduced, that is to say the value of the brightness is divided, for example, by 16, then N equals 16.

The result of this equation is a parameter Si representing a measurement of similarity or resemblance between the current image i and the previous image i−1. More particularly, it is an inverse similarity measurement: in this embodiment, the similarity measurement decreases with the resemblance in terms of signal between the images. Thus the value of the parameter Si is zero when the current i and previous i−1 images are identical. On the other hand, the value of Si increases when the similarity or resemblance between the current i and previous i−1 images decreases.

In another embodiment, it is possible to divide the current image i' (situated on the right-hand part of FIG. 6) into several subparts i1', i2', i3', i4' and to calculate a histogram for each image subpart i1', i2', i3', i4'. In this case, steps S81, S82 and S83 are applied successively to each of the image subparts i1', i2', i3', i4'.

For calculating or estimating the measurement of similarity Si, it is possible to use various similarity measurement methods. In one embodiment, an inverse measurement of the similarity such as SAD (the acronym for "sum of absolute differences") is calculated between the pixels of the current image and of the previous image.

In another embodiment, a direct measurement of the similarity such as correlation is calculated between the current and previous images. The value Si is then defined as being the inverse of this measurement.

Figure 7:
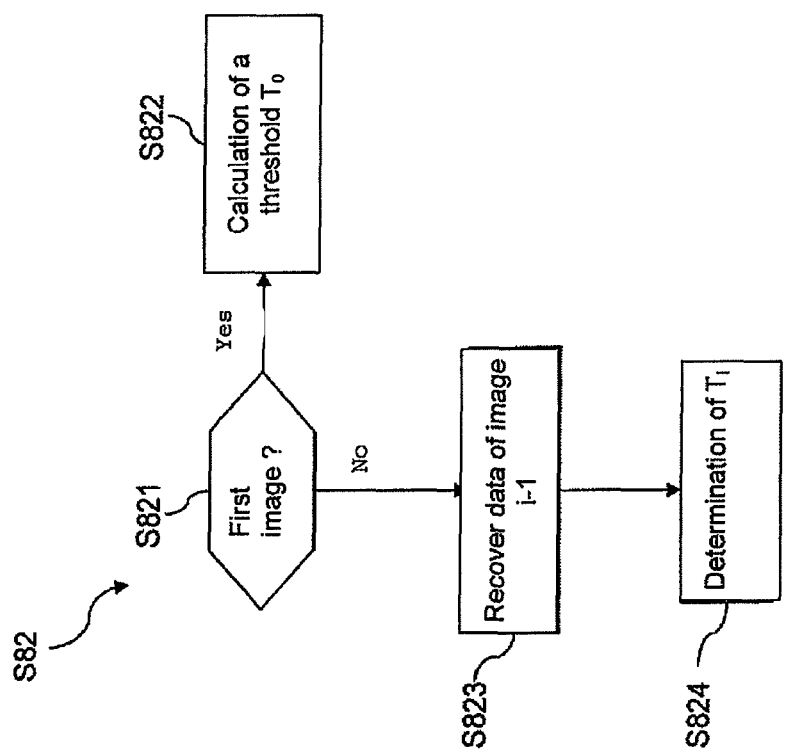
FIG. 7 is a flow diagram representing in detail step S82 of FIG. 5.

As indicated previously, step S82 (FIG. 5) of determining information relating to the concealed errors in the previous image (or prior image), and the use of this information, will now be described with reference to FIG. 7.

As described above, the concealment of errors applied to missing or erroneous data image is not perfect. Thus an image to which an error concealment has been applied has defects.

If the image to which a concealment method has been applied is employed as the previous image i−1 during the concealment of a current image i, the errors in the previous image i−1 due to the error concealment have an impact on the determination of the resemblance between the current image i and the previous image i−1.

Likewise, when this current image i is employed as the previous image for the concealment of errors in a following image i+1 (the image then becoming the new current image), the errors introduced during the concealment applied in the current image i (the image i being the new previous image) are transmitted to the following image i+1.

In other words this means that two images that are similar could be considered to be non-similar because of errors introduced into the previous image by the error concealment.

Thus the purpose of the determination step S82 is to characterize the similarity between the current image i and the previous image i−1 from the information relating to the errors concealed in the previous image i−1.

Thus, during this determination step S82, a threshold Ti is determined from the information relating to the errors concealed in the previous image.

This threshold Ti is an adaptive threshold for each current image i and previous image i−1 pair.

Here the threshold Ti represents a similarity value beyond which the current image i and the previous image i−1 are no longer considered to be similar.

Step S82 comprises more particularly a first verification step S821 during which it is checked whether the current image i is the first image in the sequence of images 4.

If the current image i is the first image in the sequence of images 4, a step of establishing a threshold T0 is implemented (S822). The value of this threshold T0 is established at a predefined value Ts that represents the limit value as from which two images are estimated to be different when there are no missing, erroneous or concealed data.

If on the other hand the current image i is not the first image in the sequence of images, an obtaining step S823 is carried out. During this obtaining step S823, information is recovered indicating the number of macroblocks that were concealed by a concealment method in the previous image i−1.

The threshold Ti is then determined, during a determination step S824, by means of the following equation:

$$T_i = T_{i-1} + a \times R_1,$$

with $$R_1 = \frac{\text{number\_concealed\_macroblocks}(i-1)}{\text{total\_number\_macroblocks}(i-1)}$$

and in which:
- Ti−1 corresponds to the threshold determined for the previous image i−1 (or value Ts if the previous image is the first image in the sequence of images 4),
- R1 corresponds to the ratio between the number of macroblocks concealed or corrected in the previous image i−1 and the total number of macroblocks in the previous image i−1,
- and a is a predefined parameter, quantifying the effect of the concealment of errors in a macroblock on the resemblance of the images, that is to say on the value of the parameter Si representing the degree of similarity between the images.

It should be noted that, when the threshold Ti is determined, account is taken of the threshold determined for the previous image Ti−1. Thus, for a given image, account is taken of the history of the error concealments performed in the previous images or only in some of them according to a choice criterion.

In this embodiment, the ratio R1 and the number of concealed macroblocks in the previous image i−1 are calculated and saved in memory during the storage step S10 (FIG. 3) for each erroneous image.

During the determination step S824, the number P of successive images i for which R1 is zero is counted. It should be noted that the value of the ratio Ti is bounded by a maximum value (Tmax).

When the ratio R1 is zero for P consecutive images i, that is to say there has not been any error concealment in the P consecutive images, the threshold Ti is reset to the value Ts.

This embodiment therefore makes it possible to characterize the resemblance of the current image i with the previous image i−1 according to the number of data items concealed in the previous image.

This is because, when the number of concealed data items increases, that is to say the image surface comprising concealed data increases, the quantity of errors introduced into the previous image i−1 is higher. Consequently the value of the parameter Si representing the similarity increases according to the similarity measurement used in this example embodiment.

This is taken into account during the determination of the threshold Ti.

This is because, when the number of concealed data items increases, the threshold value Ti increases.

The threshold Ti can be determined, according to a second embodiment, by means of the following:

$$T_i = T_{i-1} + a \times R_1 - b \times R_2,$$

with $$R_1 = \frac{\text{number\_concealed\_macroblocks}(i-1)}{\text{total\_number\_macroblocks}(i-1)}$$

$$R_2 = \frac{\text{number\_intra\_macroblocks}(i)}{\text{total\_number\_macroblocks}(i)}$$

and in which:
Ti is bounded by a predefined maximum value (Tmax) and minimum value (for example Ts);
R2 corresponds to the ratio between the number of macroblocks coded in INTRA mode and the total number of macroblocks in the current image i;
and b is a predetermined parameter representing the effect of correction of an INTRA macroblock on the errors introduced by an error concealment.

Thus, in this embodiment, in addition to taking account of the number of concealed data items in the previous image, account is taken of the type of coding employed for the current image.

This is because, when a current image that has been coded according to an INTRA coding is decoded, the errors (and in particular the errors introduced by an error concealment applied) in the previous image i−1 are not transmitted to the current image i.

According to a third embodiment, the threshold Ti is determined using the following formula:

$$T_i = T_{i-1} + a(m_{conc}) \times R_1 - b(m_{intra}) \times R_2$$

with $$R_1 = \frac{\text{number\_concealed\_macroblocks}(i-1)}{\text{total\_number\_macroblocks}(i-1)}$$

$$R_2 = \frac{\text{number\_intra\_macroblocks}(i)}{\text{total\_number\_macroblocks}(i)}$$

$m_{conc}$ = concealment method $m_{intra}$ = nature of INTRA coding and in which:
Ti is bounded by a predefined maximum value (Tmax) and minimum value (for example Ts),
the parameters a and b have different values according respectively to the concealment method applied to the previous image i−1 and the nature of the INTRA coding in the current image i.

Thus a(mconc) has a predetermined value that depends on the result of the concealment method employed.

For example, when the error introduced by the concealment method is high, the value taken by the parameter a(mconc) is high.

On the contrary, when the error introduced by the concealment method is small, the value taken by the parameter a(mconc) is low.

By way of in no way limitative example a(mconc) has a value of 5 for a temporal concealment method and a value of 8 for a spatial concealment method.

The parameter b(mintra) has a value that depends on the nature of the INTRA coding. For example, if the server has the functionalities "Intra Refresh" or "Intra Adaptive Refresh", the errors introduced by the concealment method are corrected more rapidly than if the server does not have one of these functionalities.

Thus, by way of in no way limitative example, b(mintra) has a value of 5 when the server does not have the "Intra Refresh" functionality and a value of 8 when the server does have one.

It should be noted that the determination of the threshold Ti is made for all the current images (valid or erroneous). In the case of an erroneous image, the threshold Ti is determined during step S824. Next the ratio R1 and the threshold Ti are stored during the storage step S10. On the other hand, in the case of a valid image, the threshold Ti is determined and stored during the storage step S10 (FIG. 3).

Figure 8:
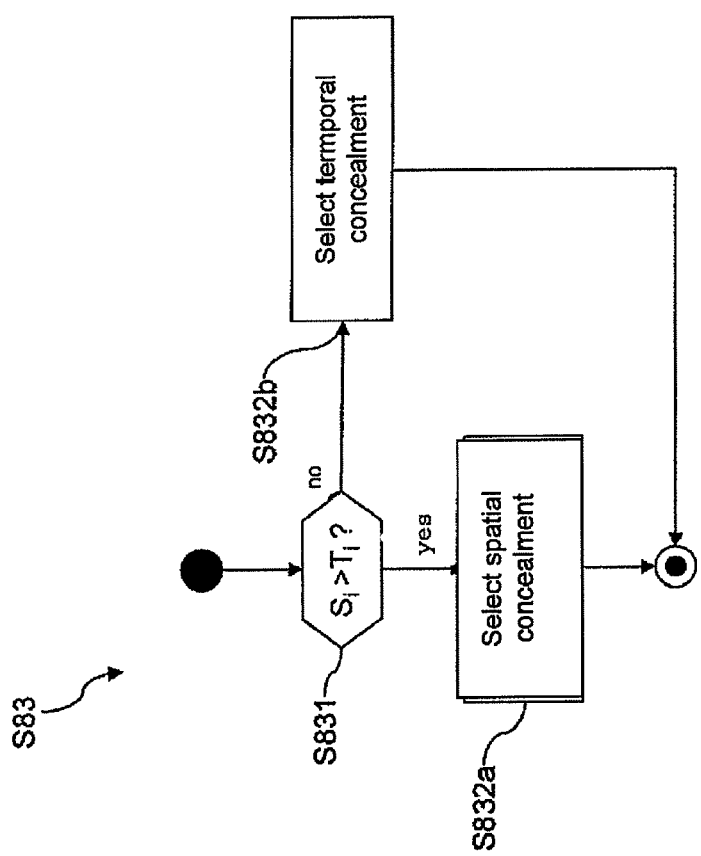
FIG. 8 is a flow diagram representing in detail step S83 of FIG. 5.

The selection step S83 (FIG. 5) of the error concealment method will now be described with the help of FIG. 8.

Once the parameter Si representing a similarity measurement and the threshold Ti have been determined, a test step S831 is implemented in order to check whether the parameter Si is higher than the threshold Ti.

Thus, when at this test step S831 the value of the parameter Si is higher than the value of the threshold Ti, it is considered that the current image i and the previous image i−1 are not similar or do not resemble each other. Consequently a spatial concealment method is selected during a selection substep S832a.

On the contrary, if, at this verification step S831, the value of the parameter Si is not higher than the value of the threshold Ti, it is considered that the current image i and the previous image i−1 are similar or resemble each other. Consequently a temporal concealment method is selected during a second selection substep S832b.

Figure 9:
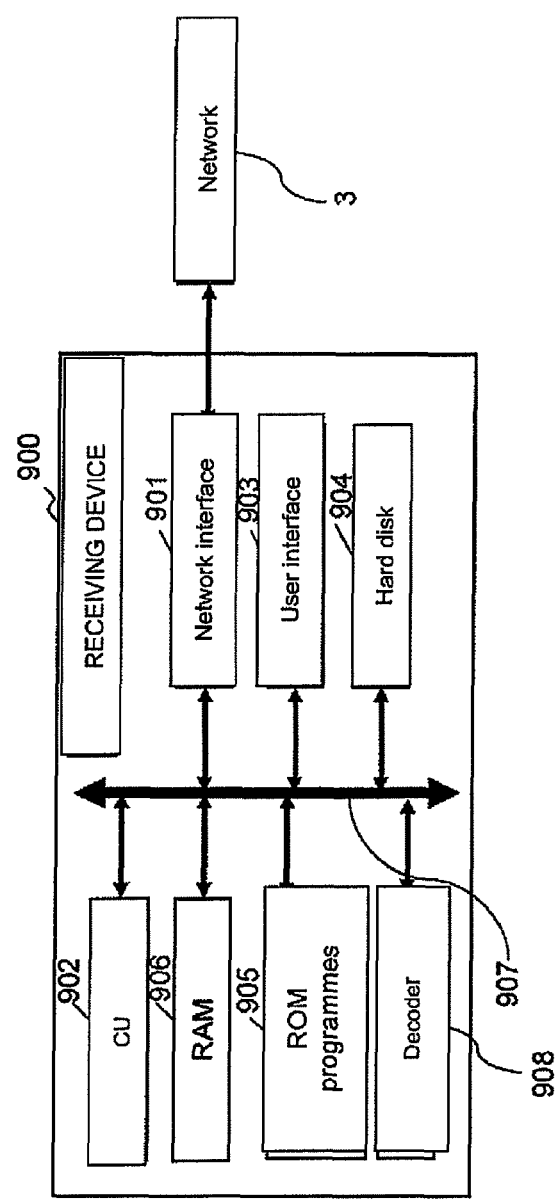
FIG. 9 depicts schematically a particular embodiment of an apparatus able to implement the present invention.

FIG. 9 illustrates a device implementing an error concealment method according to the invention in a particular embodiment.

The communication device or apparatus 900 (able to communicate over a network) comprises a network communication interface 901 that allows connection of the device 900 to the communication network 3. The software application, when it is executed by the central unit 902, is adapted to react to requests by means of the network communication interface 901 and to supply data streams by means of the network (server 1). Conversely, the device 900 is adapted to transmit requests via the network 3 and to receive in response a data stream to be processed (client 2). The network communication interface 901 is able to receive digital data to be processed by the device in the context of the implementation of the invention.

The device also comprises an optional user interface 903 for displaying information to a user, and/or receiving inputs therefrom.

The device 900 also comprises a storage means 904 such as for example a hard disk. It can also comprise a disk drive.

This disk may be a diskette, a CD-ROM or a DVD-ROM, a memory card or a USB peripheral for example. The disk may contain data processed according to the invention as well the program or programs implementing the invention which, once read by the device 900, will be stored on the hard disk 904. According to a first variant, the program or programs enabling the device to implement the invention may be stored in read only memory 905 (referred to as ROM). In a second variant, the program or programs can be received in order to be stored in an identical fashion to that described previously by means of the communication network.

This same device may have a screen for displaying the processed data or serving as an interface with the user, who can thus select other data to be processed, by means of the keyboard or any other means (mouse, wheel or stylus for example).

The central unit 902 (referred to as CU on the drawing) is capable of executing the instructions relating to the implementation of the invention, instructions stored in the read only memory 905 or in the other storage elements. For example, the central unit executes the steps illustrated in FIGS. 3, 5, 7 and 8 already described. On powering up, the processing programs stored in a non-volatile memory, for example the ROM 905, are transferred into the random access memory RAM 906, which will then contain the executable code of the invention as well as registers for storing the variables necessary for implementing the invention.

The memory capacity can be increased by an optional RAM memory connected to an extension port (not illustrated). The instructions concerning the software application can also be loaded into the random access memory RAM 906 from the hard disk 904.

In more general terms, an information storage means, able to be read by a computer or a microprocessor, integrated or not in the device, possible totally or partially removable, is adapted to store one or more programs whose execution allows the implementation of the error concealment method according to the invention. Such a software application, when executed by the central unit 902, gives rise to the execution of the steps of the flow diagrams/algorithms illustrated in FIGS. 3, 5, 7 and 8.

The means of a concealment device adapted to implement the error concealment method according to the invention described above comprise the central unit 902, the ROM 905, the RAM 906 and the hard disk 904.

In particular, the central unit 902, the ROM 905, the RAM 906 and the hard disk 904 comprise in particular means of comparing the images with each other and values of the parameter representing a measurement of similarity with a threshold, means of selecting a concealment method, and means of determining the parameter representing a measurement of similarity between images.

A communication bus 907 affords communication between the various elements included in the device 900 or connected to it. The representation of the bus 907 is not limitative and in particular the central unit 902 is able to communicate instructions to any element of the device 900 directly or by means of another element of the device 900.

The device 900 also comprises a decoder 908, for example in the form of a standard chip, used by the central unit 901 in a conventional manner through the bus 907.

This device 900 is for example a microcomputer or a workstation or a digital assistant or a portable telephone or a digital camcorder or a digital photographic apparatus or a video surveillance camera (Webcam) or a DVD drive or a multimedia server or a router element in a network. This apparatus can include directly a digital image sensor, or be connected to various peripherals such as for example a digital camera (or a scanner or any image acquisition or storage means) connected to a graphics card and supplying multimedia data to the apparatus. The apparatus can also have access to multimedia data on a storage medium (for example the hard disk 904) or receive from the network a multimedia stream to be modified.

Thus by virtue of the invention it is possible to dynamically select, for each image in a sequence of images, the most suitable and most effective error concealment method.

Consequently the quality of the images comprising data thus masked is improved thereby.

Naturally many modifications can be made to the example embodiment described previously without departing from the scope of the invention.

For example, the method according to the invention can be applied to an image part. Thus, when the image is divided into several image parts, different concealment methods can be applied to each image part.

What we claim is:

1. A method of concealing errors in at least part of a current image in a sequence of images, comprising the following steps of:
    comparing the at least one part of the current image with at least one corresponding part of a previous image;
    determining a parameter representing a measurement of similarity between the at least one part of the current image and the at least one corresponding part of the previous image from the result of the comparison of the at least one part of the current image with the at least one corresponding part of the previous image; and
    selecting a temporal error concealment method or a spatial error concealment method to be applied in the at least one part of the current image, according to the result of said comparing step and at least one item of information relating to the errors concealed in the at least one corresponding part of the previous image,
    wherein said selecting step comprises a substep of comparing the parameter representing the measurement of similarity with a threshold determined from the at least one item of information relating to the errors concealed in the at least one corresponding part of the previous image;
    the threshold represents a similarity value at which the at least one current image part and the at least one corresponding previous image part are no longer considered to be similar, and
    the at least one item of information relating to the errors concealed and the threshold comprise an item of information representing an amount of concealed data in the at least one corresponding part of the previous image.

2. A method according to claims 1, wherein, when the amount of concealed data is zero for a predetermined number of consecutive previous images, the threshold is reset to a predetermined value.

3. A method according to claim 1, wherein, during said selecting step, a temporal error concealment method or a spatial error concealment method is selected according to the result of the comparison of the parameter representing a similarity measurement with the threshold.

4. A method according to claim 1, wherein said comparing step comprises the comparison of the value of at least some of the pixels of the at least one current image part with the value of at least some of the pixels of the at least one corresponding part of the previous image respectively.

5. A method according to claim 1, wherein the selection of the error concealment method to be applied in the at least one part of the current image is also made according to the type of coding of the at least one part of the current image.

6. A method according to claim 1, wherein the at least one item of information relating to the concealed errors comprises an item of information representing the concealment method applied in the at least one corresponding part of the previous image.

7. A method according to claim 1, wherein the previous image corresponds to the image decoded before the current image.

8. A method according to claim 1, wherein the previous image corresponds to the image preceding the current image in the order of display of the images in the sequence.

9. A method according to claim 1, wherein said comparing step comprises the comparison of a histogram of the current image with a histogram of the previous image.

10. A device for concealing errors in at least one part of a current image in a sequence of images, comprising:
- at least a processor and memory, cooperating to function as:
- a comparison unit configured to compare the at least one part of the current image with at least one corresponding part of a previous image;
- a determination unit configured to determine a parameter representing a measurement of similarity between the at least one part of the current image and the at least one corresponding part of the previous image from the result of the comparison of the at least one part of the current image with the at least one corresponding part of the previous image; and
- a selection unit configured to select a temporal error concealment method or a spatial error concealment method to be applied in the at least one part of the current image according to the result obtained by said comparison unit and at least one item of information relating to the errors concealed in the at least one corresponding part of the previous image,.
- wherein said selection unit compares the parameter representing the measurement of similarity with a threshold determined from the at least one item of information relating to the errors concealed in the at least one corresponding part of the previous image;
- the threshold represents a similarity value at which the at least one current image part and the at least one corresponding previous image part are no longer considered to be similar, and
- the at least one item of information relating to the errors concealed and the threshold comprise an item of information representing the amount of concealed data in the at least one corresponding part of the previous image.

11. A device according to claim 10, wherein said comparison unit compares the value of at least some of the pixels of the at least one part of the current image with a value of at least some of the pixels of the at least one corresponding part of the previous image respectively.

12. A device according to claim 10, wherein said comparison compares a histogram of the current image with a histogram of the previous image.

13. A non-transitory computer-readable storage medium storing an executable program for causing a computer to execute a method according to claim 1.

14. A storage medium according to claim 13, wherein said storage medium is partially or totally removable.

* * * * *